UNITED STATES PATENT OFFICE.

CARL OSCAR MÜLLER, OF BASLE, SWITZERLAND, ASSIGNOR TO L. DURAND, HUGUENIN & CIE., OF SAME PLACE, ST. FONS, FRANCE, AND HÜNINGEN, GERMANY.

BLUE-BLACK DYE.

SPECIFICATION forming part of Letters Patent No. 640,010, dated December 26, 1899.

Application filed July 12, 1899. Serial No. 723,571. (Specimens.)

*To all whom it may concern:*

Be it known that I, CARL OSCAR MÜLLER, chemist, a subject of the King of Saxony, and a resident of Basle, Switzerland, have invented new and useful Improvements in Blue-Black Coloring-Matters for Dyeing Mordanted Wool, of which the following is a clear, full, and exact specification.

I have found that a blue-black disazo coloring-matter can be obtained containing the tetrazo derivative of paraphenylenediamin, which resists the light and fulling and which is therefore of great industrial value if one of the components, coupled with the said tetrazo derivative is formed by an orthocarboxylized phenol of the benzene series, such as salicylic acid and its homologues, while the other component, coupled with the said tetrazo derivative, is constituted by the 1. 8. 3. 6. dioxynaphthalene-disulfonic acid. The coloring-matter thus obtained produces upon wool which is chromed, either before or after dyeing, blue-black tints that are exceedingly resisting to light and fulling.

For the manufacture of this coloring-matter the best way is to go out from the amidobenzeneazo salicylic acid.

*Example:* Twenty-seven kilos of paraämidobenzeneazo salicylic acid (obtained either by combination of paranitrodiazobenzene with salicylic acid and the subsequent reduction of the resulting combination or by combination of the diazo derivative of monoacetparaphenylenediamin with salicylic acid and subsequent saponification of the resulting combination) are transformed in the known manner into the diazo derivative. This diazo derivative is run into a solution of thirty-seven kilos of sodium dioxynaphthalenedisulfonate, (OH: OH: $SO_3Na$: $SO_3Na$ = 1: 8: 3: 6,) which solution has been rendered alkaline by means of carbonate of soda in order that the mass may remain alkaline up to the end of the reaction. The coloring-matter formed is then precipitated by an addition of common salt, is pressed, and dried. It dyes chromed wool in black tints very resisting to light and fulling and constitutes in dry state a black powder which dissolves in water with a red-violet and in concentrated sulfuric acid with a blue coloration. By recrystallization it may be purified.

The salicylic acid may be replaced by cresotinic acid, (ortho-oxy-toluic acid.)

The present invention does not relate to the particular process described for producing the new product, nor is it limited thereto.

What I claim is—

1. As a new article of manufacture, the herein-described dyestuff which contains the tetrazo derivative of paraphenylene-diamin coupled on the one hand with an orthocarboxylized phenol of the benzene series and on the other hand with the 1. 8. 3. 6 dioxynaphthalenedisulfonic acid and which dyes chromed wool in blue-black tints exceedingly resisting to light and fulling, and constitutes in a dry state a black powder which dissolves in water with a red-violet coloration, and in concentrated sulfuric acid with a blue coloration.

2. As a new article of manufacture, the herein-described dyestuff which contains the tetrazo derivative of paraphenylene-diamin coupled on the one hand with salicylic acid and on the other hand with the 1.8.3.6 dioxynaphthalenedisulfonic acid and which dyes chromed wool in blue-black tints exceedingly resisting to light and fulling, and constitutes in a dry state a black powder which dissolves in water with a red-violet coloration, and in concentrated sulfuric acid with a blue coloration.

In witness whereof I have hereunto signed my name, this 28th day of June, 1899, in the presence of two subscribing witnesses.

CARL OSCAR MÜLLER.

Witnesses:
GEORGE GIFFORD,
AMAND RITTER.